(12) United States Patent
Wintergerst

(10) Patent No.: US 10,183,771 B2
(45) Date of Patent: Jan. 22, 2019

(54) PACKAGE PICK-UP DEVICE HAVING PIVOTING RETAINING ELEMENTS

(71) Applicant: MULTIVAC Sepp Haggenmüller SE & Co. KG, Wolfertschwenden (DE)

(72) Inventor: Bernd Wintergerst, Hawangen (DE)

(73) Assignee: MULTIVAC SEPP HAGGENMÜLLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 15/708,027

(22) Filed: Sep. 18, 2017

(65) Prior Publication Data

US 2018/0079541 A1    Mar. 22, 2018

(30) Foreign Application Priority Data

Sep. 20, 2016 (EP) ..................................... 16189664

(51) Int. Cl.
| | | |
|---|---|---|
| *B65B 35/18* | (2006.01) | |
| *B66C 1/02* | (2006.01) | |
| *B25J 15/00* | (2006.01) | |
| *B65G 47/91* | (2006.01) | |
| *B65G 61/00* | (2006.01) | |
| *B65B 63/04* | (2006.01) | |

(Continued)

(52) U.S. Cl.
CPC ........... *B65B 35/18* (2013.01); *B25J 15/0061* (2013.01); *B65B 63/04* (2013.01); *B65G 47/90* (2013.01); *B65G 47/907* (2013.01); *B65G 47/91* (2013.01); *B65G 47/917* (2013.01); *B65G 47/918* (2013.01); *B65G 57/081* (2013.01); *B65G 61/00* (2013.01); *B66C 1/0275* (2013.01); *B65H 2301/3322* (2013.01); *B65H 2301/4472* (2013.01)

(58) Field of Classification Search
CPC ............................. B65J 15/0633; B65B 35/18
USPC .......................... 294/183, 185, 186, 189, 65
See application file for complete search history.

(56) References Cited

U.S. PATENT DOCUMENTS

| | | |
|---|---|---|
| 3,040,921 A | 6/1962 | Davis |
| 3,596,967 A | 8/1971 | Carter |

(Continued)

FOREIGN PATENT DOCUMENTS

| | | |
|---|---|---|
| CA | 2640989 A1 | 4/2009 |
| DE | 3014896 A1 | 7/1981 |

(Continued)

*Primary Examiner* — Paul T Chin
(74) *Attorney, Agent, or Firm* — Husch Blackwell LLP

(57) ABSTRACT

A pick-up device for picking up packages that may include a frame to which a first and a second retaining element are mounted. Each retaining element may comprise a retaining side that is adapted to hold a package or a package section. The first and the second retaining elements may be adapted to be arranged in a starting position, such that the first and the second retaining sides are oriented one next to the other in an aligned manner. Both the first and the second retaining elements are pivotable about a common pivot axis, so that in at least one pivoted position, both the first and the second retaining elements are arranged pivoted by a first and a second angle respectively, wherein the retaining element are pivoted relative to the starting position. In one embodiment, both the first and the second angles are greater than zero.

20 Claims, 13 Drawing Sheets

(51) Int. Cl.
    *B65G 47/90*     (2006.01)
    *B65G 57/081*     (2006.01)

(56) References Cited

U.S. PATENT DOCUMENTS

| | | | | |
|---|---|---|---|---|
| 4,452,351 | A * | 6/1984 | Meeker | B65G 47/244 |
| | | | | 198/434 |
| 5,173,029 | A * | 12/1992 | Delventhal | B23Q 3/18 |
| | | | | 198/434 |
| 5,733,097 | A * | 3/1998 | Herbermann | B21D 43/055 |
| | | | | 294/65 |
| 6,502,877 | B2 * | 1/2003 | Schick | B25J 15/06 |
| | | | | 294/185 |
| 9,757,858 | B2 * | 9/2017 | Eto | B25J 9/1612 |
| 2003/0132562 | A1 | 7/2003 | Maeda | |
| 2006/0043747 | A1 | 3/2006 | Kniss | |
| 2016/0107408 | A1 * | 4/2016 | Hutter | B31B 1/80 |
| | | | | 493/313 |
| 2016/0207195 | A1 * | 7/2016 | Eto | B25J 9/1612 |

FOREIGN PATENT DOCUMENTS

| | | |
|---|---|---|
| DE | 69306083 T2 | 4/1997 |
| DE | 69833909 T2 | 8/2006 |
| JP | 1158283 A | 3/1999 |
| WO | 2004103652 A2 | 12/2004 |

\* cited by examiner

PACKAGE PICK-UP DEVICE HAVING PIVOTING RETAINING ELEMENTS

CROSS-REFERENCE TO RELATED APPLICATIONS

This Application claims priority to European Patent Application No. 16189664.2, filed on Sep. 20, 2016, to Bernd Wintergerst, currently pending, the entire disclosure of which is incorporated herein by reference.

FIELD OF THE INVENTION

The invention relates to a pick-up device for packages.

BACKGROUND OF THE INVENTION

A pick-up device for packages, for example bags, is known, for example, from DE 693 06 083 T2. There, packages are picked up by so-called claws that grip around the packages from above. Such solutions and similar ones are inappropriate for various packages and fields of application since sufficient space must be provided for the movement of the claw that grips around the packages. It must be in particular ensured that the packages to be picked up are accessible both from above and from the bottom, so that the device may grip around them. Moreover, the handling possibilities after picking up and putting down the packages are restricted.

SUMMARY OF THE INVENTION

It is the object of the invention to provide an improved pick-up device that may be employed more flexibly. The pick-up device for packages according to the invention may comprise a frame to which a first and a second retaining element are mounted, each of the retaining elements comprising a retaining side which is each adapted to hold a package or a package section. The first and second retaining elements may be adapted to be arranged in a starting position, such that the first and the second retaining sides are oriented one next to the other in an aligned manner. Both the first and the second element may be pivotable about a common pivotal axis, so that in a pivoted position, both the first and the second retaining element are arranged in a pivoted way by a first and a second angle each, with respect to the starting position, wherein both the first and the second angle are greater than zero.

By the respective retaining sides each being adapted to retain one package or one package section, it may be possible for the retaining elements to hold packages independent of one another. By both retaining elements being pivotable about one common pivot axis, there are new handling possibilities for the retained packages or package sections, folding two package sections or placing two individual packages one upon the other or nesting two individual packages into each other. Since it may be possible to arrange the two retaining elements in a starting position in such a manner that the first and second retaining sides are oriented one next to the other in an aligned manner, it may be, in combination with the above mentioned ability to hold one package or one package section, possible to also pick up packages or package sections that are accessible only from one side. Preferably, the retaining sides are horizontally aligned in the starting position. The first and second angles may be independent of each other and may be at least 5°, preferably at least 10°, particularly preferred at least 30° in the pivoted position.

In a preferred variation, the retaining side of the first retaining element may, in the pivoted position, be arranged substantially vertically and opposite to the retaining side of the second retaining element. This permits a number of additional handling possibilities for picked-up packages. It may be conceivable that two package sections of one package are each picked up and held by one of the two retaining elements in the starting position. By assuming the pivoted position, the two package sections of the package may be folded. Moreover, two individual packages may be placed one upon the other or nested into each other. To improve legibility, the expression "packaging section" will be mostly used below. However, this is to be understood in such a way that two interconnected package sections of the same package as well as individual packages that are to be placed one upon the other or nested into each other fall within the present use of "packaging section."

Furthermore, it may be conceivable that one package is first picked up and held by the first retaining element in the starting position, is released from the first retaining element and held by the second retaining element in the pivoted position, and may thus be put down after having assumed the starting position in a flipped orientation.

In a further variation, it may be that the retaining elements are pivoted to a second pivoted position only to such an extent that the two retaining sides are not yet positioned oppositely. A picked-up package may be thus slightly bent to permit handling in restricted spaces.

In one embodiment, it may be advantageous for the first and second retaining elements to be configured to hold one package or one package section during the pivoting procedure. This may increase handling safety.

Preferably, the first and second retaining elements may be adapted to pivot each at the same angular velocity. Thereby, for example unbalances and resulting vibrations may be avoided.

It may be particularly advantageous in some circumstances for the first and second retaining elements to be adapted to pivot synchronously. Pivoting at the same angular velocity as well as synchronous pivoting may be ensured by mechanical gears, such as gearings or sliding gears or linkages. It may also conceivable that the retaining elements may be actuated independently by actuators that may be controllable by an open-loop or closed-loop control unit. In this case, pivoting at the same angular velocity and/or synchronous pivoting may be ensured by a corresponding open-loop and/or closed-loop control.

It may also advantageous in some embodiments for the first and second retaining elements to be adapted to pivot into opposite directions. This may permit, for example, folding procedures as the ones mentioned above.

It may be particularly advantageous for the first and second retaining elements to be pivoting such that the pivot axis is shifted relative to the frame during pivoting of the first and second retaining elements. This may advantageously permit the two retaining elements to start pivoting directly during or directly after the picking-up of the package or the package section. This may save handling time, and optionally a higher working speed may be achieved. It is conceivable that the pivot axis shifts linearly into one direction. It may be particularly advantageous for the direction of shifting running in parallel to the direction of gravity.

In one embodiment, it is conceivable for the first and second retaining elements to be arranged asymmetrically to each other with respect to the pivot axis. Thus, packages whose package sections have to be folded with an offset with respect to each other may be properly folded. This may be the case with packages with several package troughs. By asymmetrically arranged retaining elements, such packages may be folded such that the package troughs of a first package section are arranged in the spaces between the package troughs of the second package section.

It may be advantageous for at least one of the retaining elements to comprise a suction device. Suction devices are particularly suited for picking up packages from one side as it is not necessary for the package to be accessible from several sides. Moreover, the packages may be held by suction devices already during the cutting process. This may be advantageous since the positioning of the packages is in this manner determined and known. This may facilitate further handling, in particular since tipping over or other positional changes of the package after cutting is avoided.

In one variation, the first and second retaining elements may pivot each by at most 90°, preferably at most 45°, particularly preferred at most 30°. A pivoting range restricted in such a manner may be suited to avoid a change of load during the pivoting of the retaining elements. In the starting position, the first and second retaining sides of the first and second retaining elements may be arranged horizontally, no change of load takes place during pivoting by at most 90°. Thereby, for example the actuation of the retaining elements by pneumatically operated actuators may also be facilitated.

In one embodiment, it may be advantageous for the first and/or second retaining element to comprise a mechanical gripper. A gripper may be provided alternatively or in addition to a suction device already mentioned above. In general, a gripper may be provided alternatively or in addition to a retaining device of the respective retaining element. In the folding process already described above, a gripper may ensure that the package sections folded one upon the other also remain folded during pivoting back into the starting position and do not unfold before they are put down. During the flipping procedure also described above, it may be sufficient to provide, at the first retaining element, either a gripper or another retaining device, for example a suction device; the same applies to the second retaining element.

The invention also relates to a method for operating a pick-up device of the type described above. The method is characterized in that a first package section and a second package section each are pivoted relative with respect to each other by pivoting the first and second retaining elements. As already mentioned in the beginning, it is by this movement that it is permitted to fold two package sections relative with respect to each other.

A further method for operating a pick-up device of the type described above may comprise at least the following steps: picking up a package by holding it at the first retaining element; pivoting the first and second retaining elements into the pivoted position, wherein in the pivoted position, the retaining side of the first retaining element is arranged essentially vertically and opposite to the retaining side of the second retaining element; releasing the package from the first retaining element and holding the package at the second retaining element; and pivoting the first and second retaining elements into the starting position.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show.

DETAILED DESCRIPTION OF THE INVENTION

Figure 1:
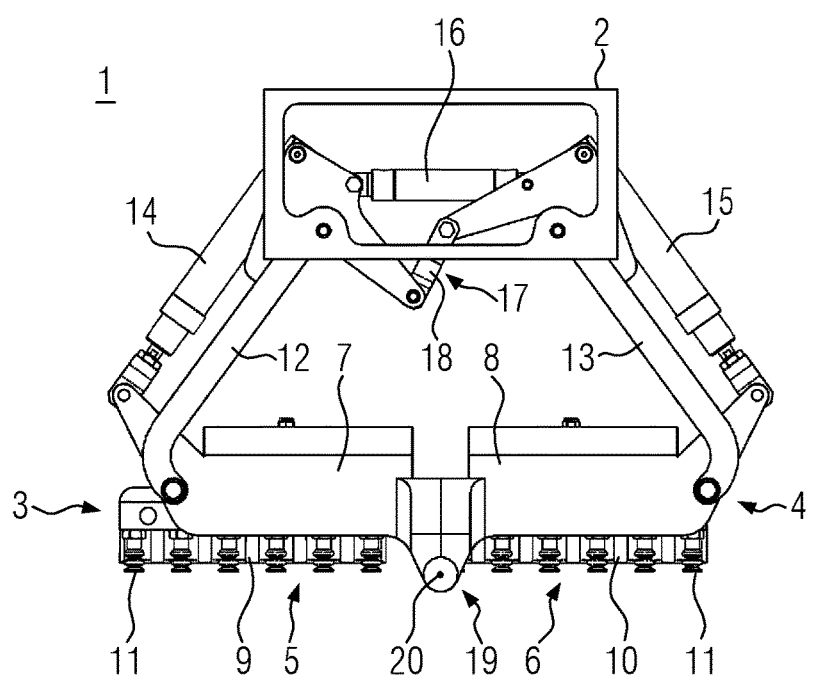
FIG. 1 is a side view of one embodiment of a pick-up device in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a pick-up device 1 in a side view. The pick-up device 1 comprises a frame 2. The latter may be fixed, for example, to a (non-depicted) robot arm or delta picker of a packaging machine. The pick-up device 1 furthermore comprises a first retaining element 3 and a second retaining element 4. Both retaining elements 3, 4 each have a retaining side 5, 6. In the starting position shown in FIG. 1, the first retaining side 5 and the second retaining side 6 are oriented next to one another in an aligned manner. In the exemplified embodiment represented in FIG. 1, both retaining elements 3, 4 each comprise a pivoting arm 7, 8. Furthermore, the retaining elements 3, 4 each comprise, in the present exemplified embodiment, a retaining device 9, 10. These may be, as in the exemplified embodiment, retaining devices of the same type, with suction devices 11, or different retaining devices 9, 10. As will be illustrated later, several different retaining devices may also be provided at one retaining element.

The retaining elements 3, 4 may, as in the exemplified embodiment, each be pivotably connected to a first and a second connection arm 12, 13. The connection arms 12, 13 may in turn be pivotably connected to the frame 2. As is also represented by way of example in FIG. 1, the retaining elements 3, 4 may each be actuated by a first and second pneumatic cylinder 14, 15. The pneumatic cylinders 14, 15 may to this end, for example, be pivotably connected on the one hand to the first and second connection arms 12, 13, and on the other hand be pivotably connected to the first and second pivoting arms 7, 8. A third pneumatic cylinder 16 may be pivotably connected to the first and second connection arms 12, 13 to enhance the closing force. To this end, the third pneumatic cylinder 16 may be configured to exert additional pressure at the end of the pivoting motion. A damping function of the third pneumatic cylinder is also conceivable. In particular, the third pneumatic cylinder 16 may be pivotably connected on one hand with the first connection arm 12, and on the other hand be pivotably connected with the second connection arm 13.

The connection arms 12, 13 may form a linkage 17 together with further components. In the present exemplified embodiment, a connecting rod 18 is provided as a further component. The latter may be pivotably connected on the one hand to the first connection arm 12 and on the other hand be pivotably connected to the second connection arm 13. A joint 19 may be provided between the first and the second retaining elements 3, 4. This may permit to pivot the first and second retaining elements 3, 4 about a common pivot axis 20.

FIG. 1, moreover, shows that the first and second retaining elements 3, 4 are arranged asymmetrically to each other with respect to the pivot axis 20. In the present exemplified embodiment, the first and second retaining devices 9, 10 are to this end arranged at the first and second pivoting arms 7, 8, respectively, at different distances to the pivot axis 20. However, it is also conceivable to ensure asymmetry by different pivoting arms 7, 8. An asymmetric arrangement of the retaining elements 3, 4 may be advantageous in certain types of packages as will be explained later.

Figure 2:
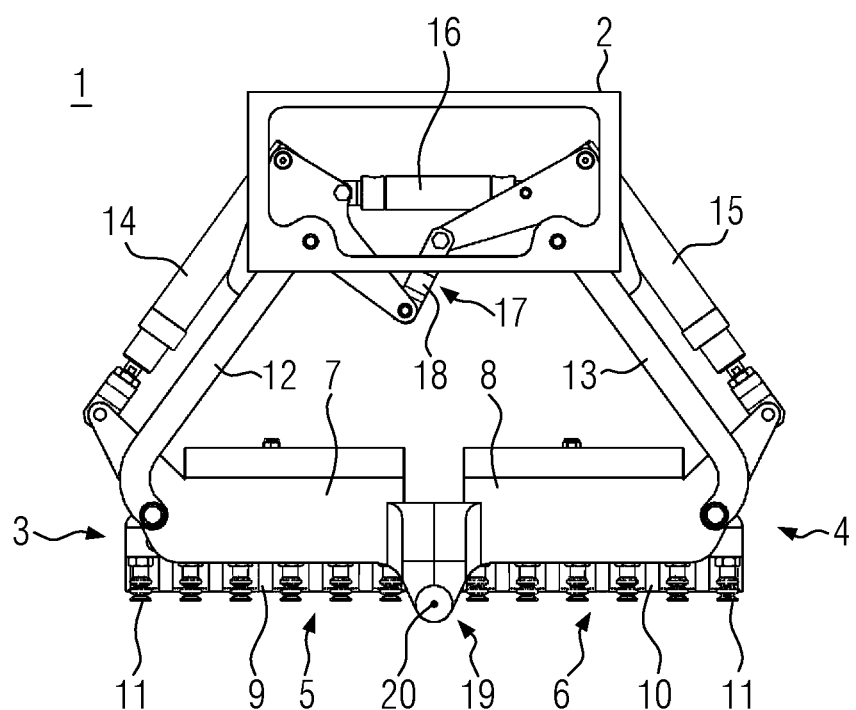
FIG. 2 is a side view of another embodiment of a pick-up device in accordance with the teachings of the present disclosure.
Figure 3:
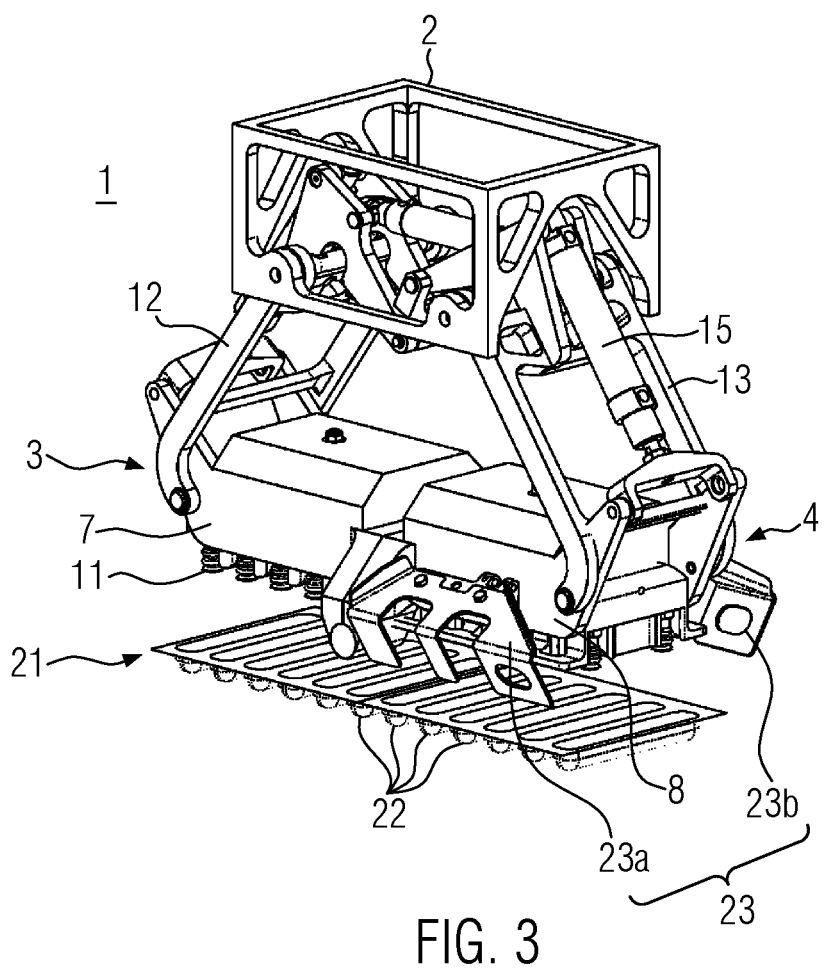
FIG. 3 is a perspective view of one embodiment of a pick-up assembly device in accordance with the teachings of the present disclosure, wherein two retaining elements are arranged in a non-pivoted starting position prior to initiating a pick-up procedure.

FIG. 2 shows a pick-up device 1 according to a further preferred embodiment. It differs from the exemplified embodiment described above with reference to FIG. 1 merely in that the first and second retaining elements 3, 4 are arranged symmetrically with respect to the pivot axis 20.

FIGS. 3 to 9 illustrate the functioning of the pick-up device 1. To improve clarity, not all reference numerals are indicated. The pick-up device 1 represented in FIGS. 3 to 9 is a pick-up device 1 with retaining elements 3, 4 asymmetrically arranged with respect to each other, as was already described with reference to FIG. 1. In addition to the pick-up device 1, one can now see a package 21. The package 21 may comprise several troughs 22 as is shown in the exemplified embodiment. At the second retaining element 4, an additional retaining device is provided in the present exemplified embodiment. This may be, as shown, a mechanical gripper 23 which may comprise, for example, a first and second gripping arm 23a, 23b. However, a gripper 23 may also be provided as first or second retaining device 9, 10 of the first or second retaining element 3, 4.

Figure 4:
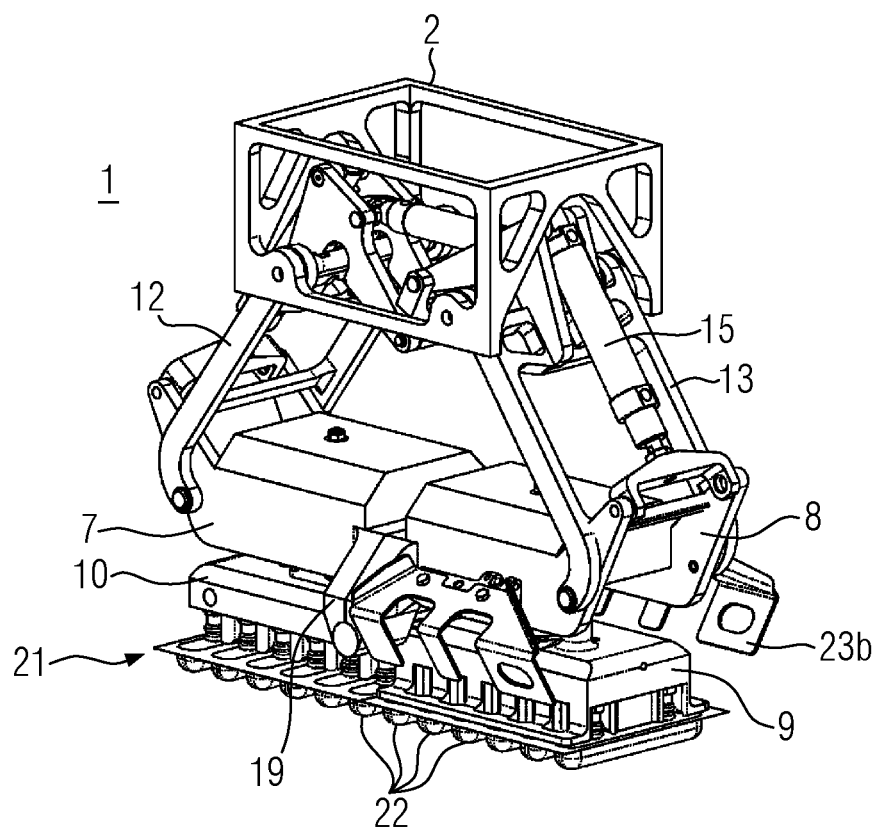
FIG. 4 is a perspective view of the pick-up assembly device of FIG. 3, wherein two retaining elements are arranged in a non-pivoted starting position during a pick-up procedure.
Figure 5:
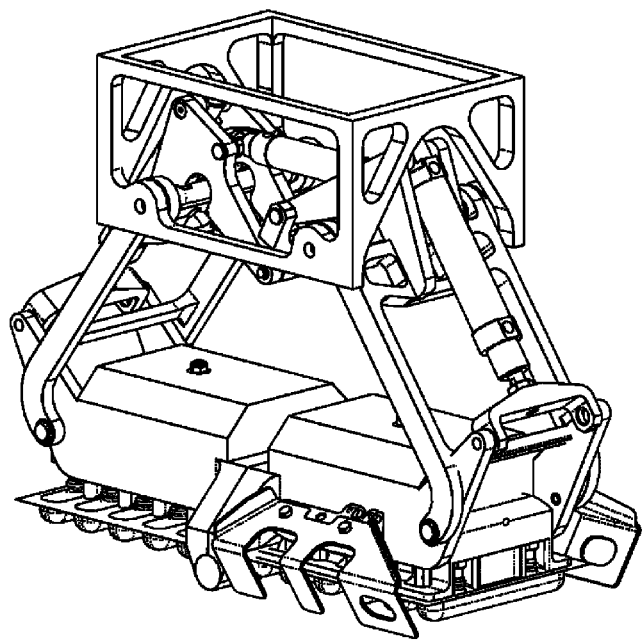
FIG. 5 is a perspective view of the pick-up assembly device of FIG. 3, wherein two retaining elements are arranged in a non-pivoted starting position during a pick-up procedure.

One can see in FIG. 4 that the retaining devices 9, 10 of the retaining elements 3, 4 already hold the package 21 but have not yet changed its position. Here, it becomes clear that the package 21 may be approached from only one side, for example, as in this case, from an upper side opposite the package troughs 22. In FIG. 5, the package 21 has been lifted.

By a suitable actuation of the pneumatic cylinders 14, 15, 16, the first and second retaining elements 3, 4 may now be pivoted in the direction of a pivoted position. During pivoting, the package 21 is still retained by the first and second retaining elements 3, 4. In the process, a first package section 21a (see FIG. 9) is held by the second retaining element 4. A second package section 21b (also see FIG. 9) is held by the first retaining element 3.

Figure 6:
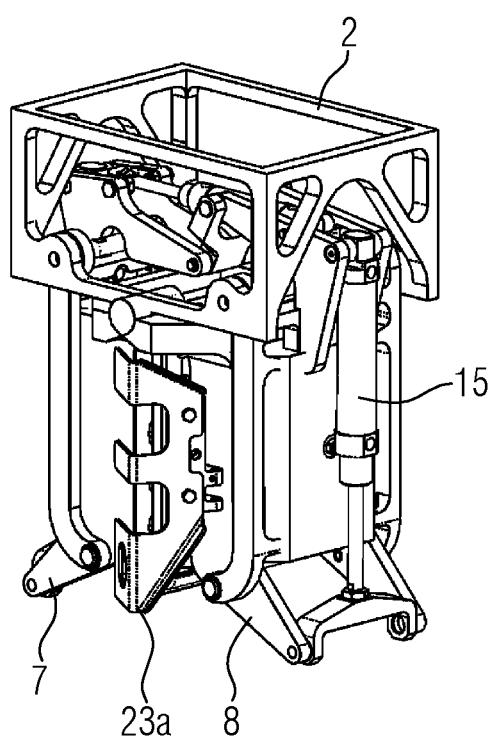
FIG. 6 is a perspective view of a portion of the pick-up assembly device of FIG. 3, in the pivoted position.
Figure 7:
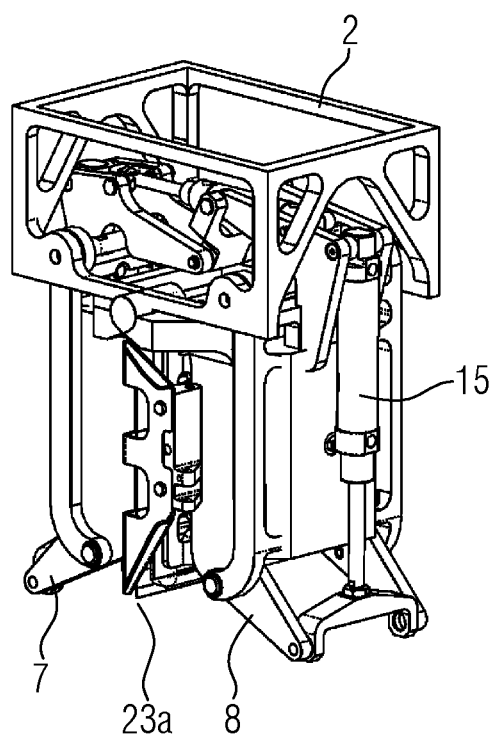
FIG. 7 is a perspective view of a portion of the pick-up assembly device of FIG. 3, wherein a gripper is actuated.

In the pivoted position shown in FIG. 6, the first and second retaining sides 5, 6 (not visible here) of the first and second retaining elements 3, 4 are arranged substantially vertically and opposite with respect to each other. The gripper 23 (in this view, only the first gripper arm 23a can be seen) is still open. The latter may then be closed as shown in FIG. 7, so that the folded package 21 cannot unfold again when the retaining elements 3, 4 are returned to the starting position. The closing of the gripper may be done before or after the second package section 21b has been released from the first retaining element 3. It is also conceivable to perform this procedure simultaneously.

Figure 8:
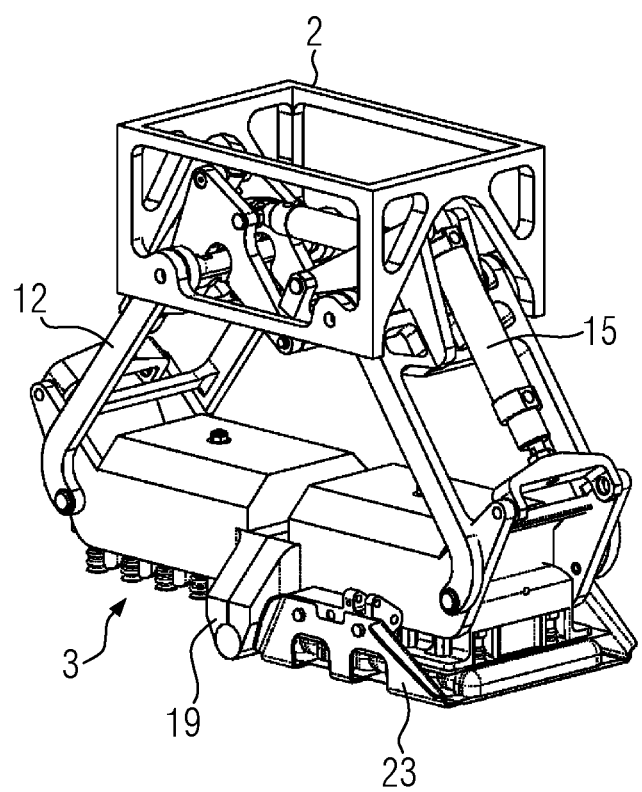
FIG. 8 is a perspective view of a portion of the pick-up assembly device of FIG. 3, wherein the retaining elements are disposed in a starting position.
Figure 9:
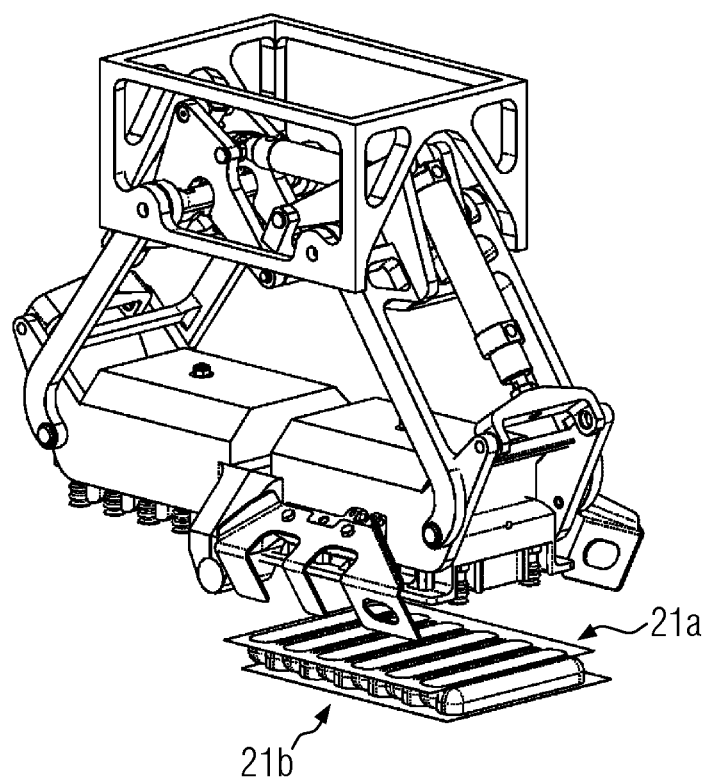
FIG. 9 is a perspective view of a portion of the pick-up assembly device of FIG. 3, wherein the retaining elements are disposed in a starting position.

In FIG. 8, the starting position is represented again. The gripper 23 is still closed. In FIG. 9, one can see that it has been opened and the folded package 21 has been put down thereby. As an alternative, there may also be two individual packages nested into each other. It can be seen that the troughs 22 of the package sections 21a, 21b grip into each other alternatingly as will be illustrated more in detail below with reference to FIGS. 10A-10D.

Figure 10B:
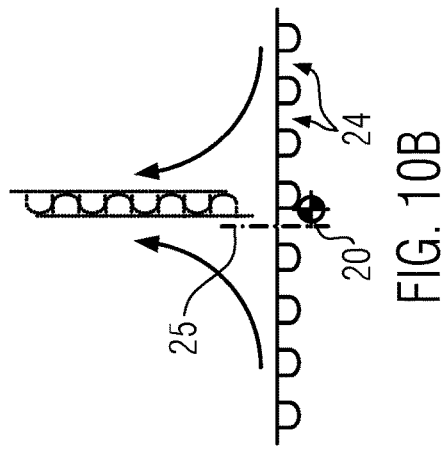
FIG. 10B is a schematic view of one procedural step of one embodiment of a folding procedure for a package using the pick-up device of FIG. 10A.
Figure 10D:
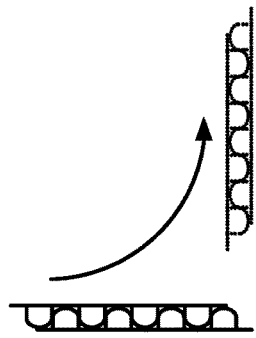
FIG. 10D is a schematic view of one procedural step of one embodiment of a folding procedure for a package using the pick-up device of FIG. 10A.
Figure 10A:
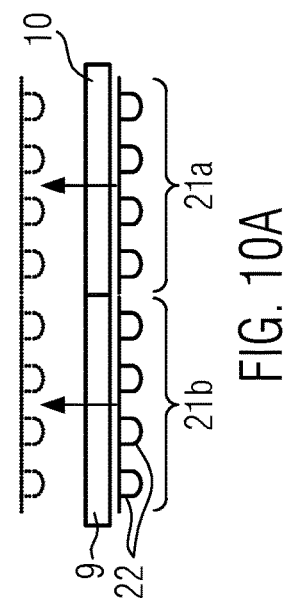
FIG. 10A is a schematic view of one procedural step of one embodiment of a folding procedure for a package using one embodiment of a pick-up device in accordance with the teachings of the present disclosure having asymmetrically arranged retaining elements.

In FIGS. 10A to 10D, various procedure steps of a method according to the invention for operating the pick-up device 1 are shown. Since the movement of the components of the pick-up device 1 essentially remains the same, the illustration is made with reference to schematic representations of the package 21. FIG. 10A shows the package 21 with the package sections 21a and 21b as well as the first and second retaining devices 9, 10. The configuration of the package shown in solid lines corresponds to the one shown in FIG. 4. The arrows show the action of force of the retaining devices 9, 10 onto the package 21. The configuration of the package 21 shown in dotted lines corresponds to the configuration shown in FIG. 5.

The configuration of the package 21 shown in FIG. 10B with solid lines also corresponds to the configuration shown in FIG. 5. Here, spaces 24 between the troughs 22 of the package 21 are illustrated. The position of the pivot axis 20 is also indicated. One can see that the latter is not lying in an indicated plane of symmetry 25 of the package 21. In this FIG. 10B, the arrows indicate the pivoting motion of the first and second retaining elements 3, 4. The resulting configuration shown in dotted lines corresponds to the configuration shown in FIG. 6.

Figure 10C:
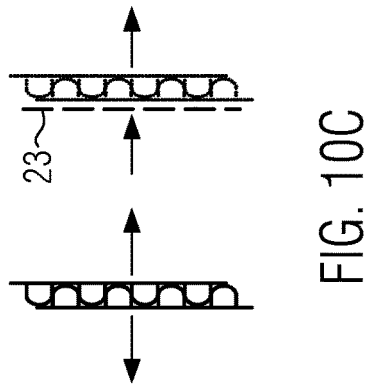
FIG. 10C is a schematic view of one procedural step of one embodiment of a folding procedure for a package using the pick-up device of FIG. 10A.

The configuration shown in FIG. 10C with solid lines also corresponds to the configuration shown in FIG. 6. Here, the arrows indicate again the retaining forces acting onto the package 21. In the configuration shown by dotted lines, the gripper 23 is closed, so that this representation corresponds to the configuration shown in FIG. 7. The arrows illustrate into which direction forces act on the package 21.

In FIG. 10D, the pivoting motion back to the starting position shown in FIG. 8 is finally shown. The latter is again shown by dotted lines.

By the asymmetric arrangement of the package with respect to the pivot axis 20, which is achieved by the asymmetrical arrangement of the first and second retaining elements 3, 4, the package has been folded in such a way that the troughs 22 of the first package section 21a are arranged in the spaces 24 between the troughs 22 of the second package section 21b, and the troughs of the second package section 22b are arranged in the spaces 24 of the first package section 21a.

Figure 11A:
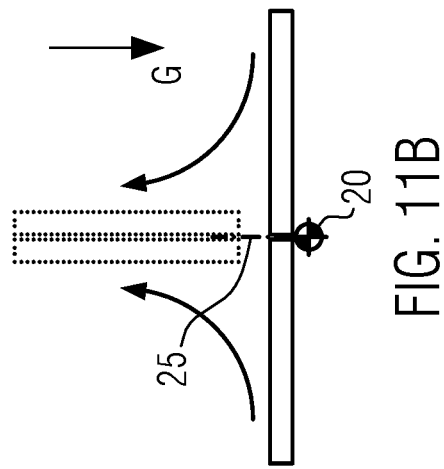
FIG. 11A is a schematic view of one procedural step of one embodiment of a folding procedure for a package using one embodiment of a pick-up device in accordance with the teachings of the present disclosure having symmetrically arranged retaining elements.
Figure 11B:
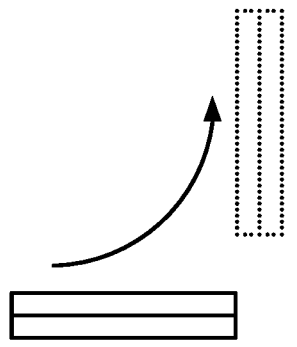
FIG. 11B is a schematic view of one procedural step of one embodiment of a folding procedure for a package using the pick-up device of FIG. 11A.

FIGS. 11A to 11D essentially show the same method. There is a difference in that the package 21 with the package sections 21a and 21b does not comprise any troughs. An even more important difference is, however, that, as can be seen in FIG. 11B, the pivot axis 20 is in this exemplified embodiment lying in the plane of symmetry 25 of the package 21. Here, the first and second retaining elements 3, 4 are correspondingly arranged symmetrically, as is shown in FIG. 2. By this symmetric arrangement of the first and second retaining elements 3, 4, the first and second package sections 21a and 21b are also arranged symmetrically with respect to the pivot axis 20 and are consequently folded onto each other essentially in a congruent manner. The method steps shown in FIGS. 11C and 11D essentially correspond to the ones shown in FIGS. 10C and 10D.

Figure 11C:
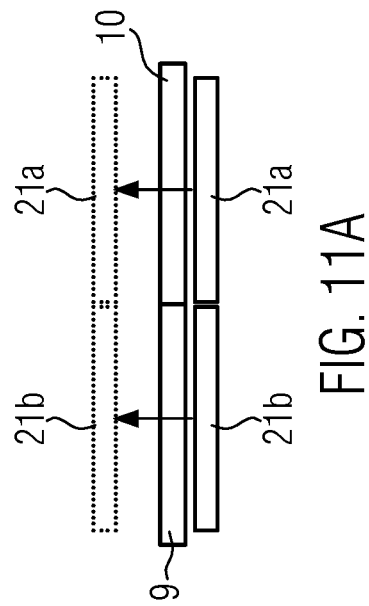
FIG. 11C is a schematic view of one procedural step of one embodiment of a folding procedure for a package using the pick-up device of FIG. 11A.
Figure 11D:
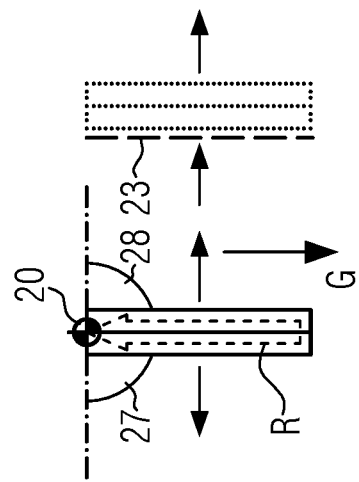
FIG. 11D is a schematic view of one procedural step of one embodiment of a folding procedure for a package using the pick-up device of FIG. 11A.

In FIG. 11C, a direction R into which the pivot axis 20 has shifted is moreover indicated with broken lines. As in the described exemplified embodiment, the direction R may extend, for example, in parallel, preferably opposite to gravity G. Moreover, in FIG. 11C, a first and a second angle 27, 28 are indicated about which the first and second retaining elements 3, 4 and thus also the first and second package sections 21a, 21b have been pivoted. In the present exemplified embodiment, both the first and the second angle 27, 28 are each 90°.

Figure 12A:
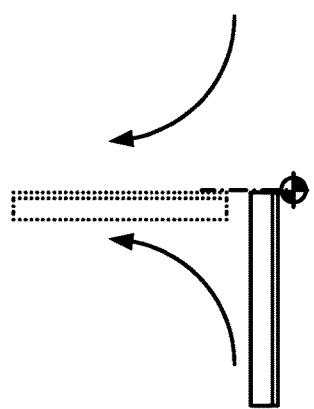
FIG. 12A is a schematic view of one procedural step of one embodiment of a procedure using one embodiment of a pick-up device in accordance with the teachings of the present disclosure for turning a package over.
Figure 12B:
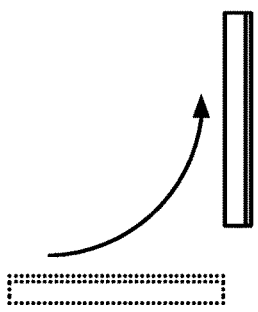
FIG. 12B is a schematic view of one procedural step of turning a package over using the pick-up device of FIG. 12A.
Figure 12C:
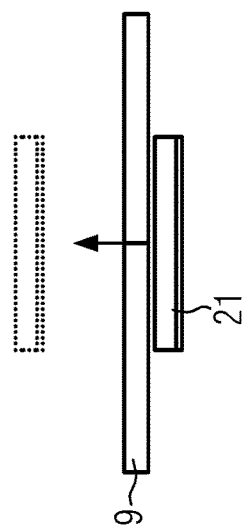
FIG. 12C is a schematic view of one procedural step of turning a package over using the pick-up device of FIG. 12A.
Figure 12D:
FIG. 12D is a schematic view of one procedural step of turning a package over using the pick-up device of FIG. 12A.

In FIGS. 12A to 12D, procedure steps of a further method according to the invention are schematically shown. The package 21, however, does not have to be folded in this exemplified embodiment. It is only to be flipped by the method illustrated with respect to FIGS. 12A-12D. To this end, it is held and lifted by the first retaining device 9 of the first retaining element 3, as is represented in FIG. 12A. After the pivoting of the first and second retaining elements 3, 4 into the pivoted position, as is shown in FIG. 12B, the package 21 is, as is shown in FIG. 12B, released from the first retaining element 3 and held by the second retaining element 4. Here, it is advantageous for the package 21 to be at least temporarily held by the two retaining elements 3, 4. After the pivoting into the starting position represented in FIG. 12D, the turned package 21 may be put down again.

The movement of the pick-up device 1 will remain the same as in the methods described with reference to FIGS. 10 and 11. As is indicated in FIG. 12B, this method may be performed by retaining elements 3, 4 arranged symmetrically with respect to the pivot axis 20. However, it is also conceivable that the method described with reference to FIGS. 12A-12D is performed by retaining elements 3, 4 arranged asymmetrically with respect to the pivot axis 20. For the method described with reference to FIGS. 12A-12D, no gripper 23 is required if both a lower and an upper surface of the package 21 are suited for suctioning. However, if one of the two surfaces of the package 21 is not suited for suctioning, a gripper 23 should be provided at the retaining element 3, 4 associated with this surface. The retaining devices 9, 10 employed for this method may be the above described suction devices 11 and a gripper 23. Combinations of a suction device 11 at the first retaining element 3 and a gripper 23 at the second retaining element 4 are also conceivable.

Figure 13:
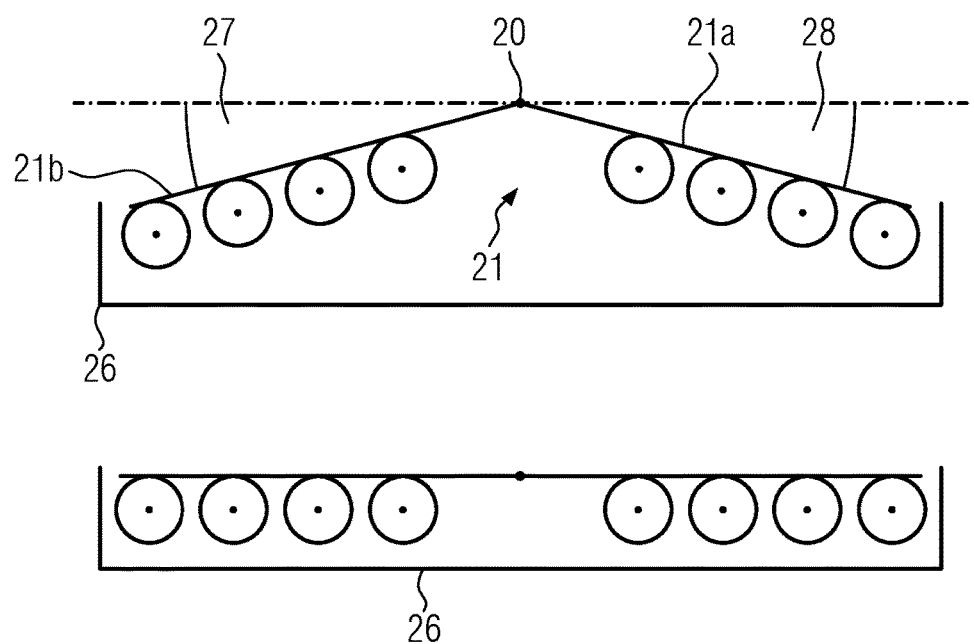
FIG. 13 is a schematic view of the procedural steps for bending a package for improving handling under restricted space conditions using one embodiment of a pick-up device in accordance with the teachings of the present disclosure.

A further advantageous case of application of the pick-up device 1 will be described below with reference to FIG. 13. Here, the package 21 is not completely folded. It should rather be inserted into an external packaging 26. Cases are conceivable where the external packaging 26 is dimensioned tightly for the dimensions of the package 21. In this case, it is advantageous if the pick-up device 1 only slightly bends the package sections 21b and 21a towards each other by a pivoting motion of the first and second retaining elements 3, 4 into a second pivoted position. In this manner, an easier insertion into the interior of the external packaging 26 can be permitted. One can see that the first and second angles 27, 28 are smaller than 45° in this exemplified embodiment. As required, it is in this exemplified embodiment moreover conceivable to select different dimensions of the angles 27, 28.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A pick-up device for packages, comprising:
   a frame;
   a first retaining element having a first retaining side and a second retaining element having a second retaining side, the first retaining element and said second retaining element being operably connected to said frame, and each of said first retaining element and said second retaining element configured for holding a package or portion thereof;
   wherein the first retaining element and the second retaining element are disposed for movement between a starting position and a pivoted position;
   wherein in said starting position, the first retaining side and the second retaining side are disposed adjacent to each other in an aligned position;
   wherein the first retaining element and the second retaining element are pivotable about a common pivot axis, so that in said pivoted position, the first retaining element is disposed at a first angle relative to its orientation in said aligned position, and said second retaining element is disposed at a second angle relative to its orientation in said aligned position, wherein both the first and the second angles are greater than zero; and
   wherein one of the first retaining element or the second retaining element comprises a gripper, wherein the gripper has one or more gripper arms, and wherein each gripper arm has one or more tines.

2. The pick-up device according to claim 1, wherein in the starting position, both the first retaining side and the second retaining side are orientated in a substantially horizontal plane, and in the pivoted position, the first retaining side and the second retaining side are arranged in a substantially vertical orientation, and the first retaining side and the second retaining side are disposed in a substantially opposing relationship.

3. The pick-up device according to claim 1, wherein the first retaining element and the second retaining element are configured for holding a package or a package section as the first retaining element and the second retaining element are moved from said starting position to said pivoted position.

4. The pick-up device according to claim 1, wherein the first and second retaining elements are adapted to pivot at the same angular velocity.

5. The pick-up device according to claim 1, wherein the first and second retaining elements are adapted to pivot synchronously.

6. The pick-up device according to claim 1, wherein the first and second retaining elements are adapted to pivot in opposite directions.

7. The pick-up device according to claim 1, wherein the first and second retaining elements are pivotable such that the pivot axis shifts relative to the frame during a pivoting motion of the first and second retaining elements.

8. The pick-up device according to claim 7, wherein the pivot axis shifts linearly in a direction.

9. The pick-up device according to claim 8, wherein the direction extends in parallel to the direction of gravity.

10. The pick-up device according to claim 1 wherein the first and second retaining elements are arranged asymmetrically to each other with respect to the pivot axis.

11. The pick-up device according to claim 1, wherein at least one of the retaining elements comprises a suction device.

12. The pick-up device according to claim 1, wherein the first and second retaining elements are each pivoted around thirty degrees (30°) at the pivoted position.

13. The pick-up device according to claim 1, wherein the one or more gripper arms pivot relative to the retaining elements.

14. The pick-up device according to claim 13, wherein the one or more gripper arms pivot about an axis extending at an angle substantially perpendicular to the pivot axis.

15. The pick-up device according to claim 1, wherein the one or more gripper arms are configured to pivot into a space present between the retaining elements when the retaining side of the first retaining element is arranged essentially vertically and opposite to the retaining side of the second retaining element.

16. The pick-up device according to claim 1, wherein the one or more gripper arms are connected to opposite sides of the retaining elements.

17. The pick-up device according to claim 1, wherein the gripper extends at substantially the same length as the retaining element.

18. The pick-up device according to claim 1, wherein only the second retaining element has a gripper.

19. A method for operating a pick-up device according to claim 1, the method comprising pivoting a first package section and a second package section relative to each other by pivoting the first retaining element and the second retaining element.

20. A method for operating a pick-up device, the method comprising:
   holding a package using a first retaining element;
   picking up the package using the first retaining element;
   pivoting the first retaining element and a second retaining element from a starting position to a pivoted position, wherein in the pivoted position, a retaining side of the first retaining element is arranged substantially vertical and opposite to a retaining side of the second retaining element;
   releasing the package from the first retaining element;

holding the package at the second retaining element using a gripper, wherein the gripper includes one or more gripper arms having at least one tine that holds the package; and pivoting the first and second retaining elements into the starting position.

* * * * *